United States Patent
Cinoman et al.

(10) Patent No.: US 8,574,708 B2
(45) Date of Patent: Nov. 5, 2013

(54) THIN CHIP RESISTANT POWDER TOPCOATS FOR STEEL

(75) Inventors: Douglas S. Cinoman, Douglasville, PA (US); Edward G. Nicholl, Reading, PA (US)

(73) Assignee: Akzo Nobel Coatings International B.V., Arnhem (NL)

(*) Notice: Subject to any disclaimer, the term of this patent is extended or adjusted under 35 U.S.C. 154(b) by 417 days.

(21) Appl. No.: 12/287,859

(22) Filed: Oct. 14, 2008

(65) Prior Publication Data

US 2009/0110934 A1   Apr. 30, 2009

Related U.S. Application Data

(60) Provisional application No. 61/001,168, filed on Oct. 31, 2007.

(51) Int. Cl.
| | | |
|---|---|---|
| B05D 3/02 | (2006.01) | |
| B32B 15/092 | (2006.01) | |
| B32B 15/18 | (2006.01) | |

(52) U.S. Cl.
USPC ............ 428/215; 428/416; 428/418; 427/195

(58) Field of Classification Search
None
See application file for complete search history.

(56) References Cited

U.S. PATENT DOCUMENTS

| | | | |
|---|---|---|---|
| 3,170,890 A | 2/1965 | Boyd et al. | |
| 3,245,925 A | 4/1966 | Watson | |
| 3,336,251 A | 8/1967 | Manasia | |
| 3,756,984 A | 9/1973 | Klaren et al. | |
| 3,769,069 A | 10/1973 | Sawyer | |
| 3,817,946 A | 6/1974 | Ree | |
| 3,860,557 A | 1/1975 | Millar et al. | |
| 3,874,883 A | 4/1975 | Robitaille et al. | |
| 3,884,705 A | 5/1975 | Blair | |
| 3,947,522 A | 3/1976 | Shelley, Jr. et al. | |
| 4,186,036 A | 1/1980 | Elms et al. | |
| 4,237,037 A | 12/1980 | Takahashi | |
| 4,242,253 A * | 12/1980 | Yallourakis ................... 523/415 |
| 4,316,939 A | 2/1982 | Guyomard | |
| 4,345,004 A | 8/1982 | Miyata et al. | |
| 4,381,334 A | 4/1983 | Balk et al. | |
| 4,491,554 A | 1/1985 | Hamel et al. | |
| 4,572,868 A | 2/1986 | Hosaka et al. | |
| 4,581,293 A | 4/1986 | Saunders | |
| 4,804,581 A | 2/1989 | Geary et al. | |
| 4,933,382 A | 6/1990 | Kitagawa et al. | |
| 5,030,285 A | 7/1991 | Vallvey et al. | |
| 5,062,284 A | 11/1991 | Kubo et al. | |
| 5,063,095 A | 11/1991 | Kitagawa et al. | |
| 5,091,242 A | 2/1992 | Chung | |
| 5,097,006 A | 3/1992 | Kapilow et al. | |
| 5,137,567 A | 8/1992 | Vallvey et al. | |
| 5,196,261 A | 3/1993 | Ono et al. | |
| 5,248,400 A | 9/1993 | Franks et al. | |
| 5,264,503 A | 11/1993 | Marx | |
| 5,274,006 A | 12/1993 | Kagoshima et al. | |
| 5,334,631 A | 8/1994 | Durand | |
| 5,338,347 A | 8/1994 | Rohr et al. | |
| 5,342,885 A | 8/1994 | St. Clair | |
| 5,461,112 A | 10/1995 | Masse et al. | |
| 5,468,461 A | 11/1995 | Hosoda et al. | |
| 5,562,989 A | 10/1996 | Statz | |
| 5,569,687 A | 10/1996 | Sanborn et al. | |
| 5,614,323 A | 3/1997 | Chang | |
| 5,677,367 A | 10/1997 | Savin | |
| 5,686,185 A | 11/1997 | Correll et al. | |
| 5,789,482 A | 8/1998 | Eldin et al. | |
| 5,789,498 A | 8/1998 | Ohnishi et al. | |
| 5,981,086 A | 11/1999 | Siminski | |
| 5,994,462 A * | 11/1999 | Srinivasan et al. .............. 525/65 |
| 6,022,927 A | 2/2000 | Decker et al. | |
| 6,025,438 A | 2/2000 | Hinterwaldner et al. | |

(Continued)

FOREIGN PATENT DOCUMENTS

| | | |
|---|---|---|
| CA | 1120253 | 3/1982 |
| CN | 1198690 A | 4/2005 |

(Continued)

OTHER PUBLICATIONS

English translation of JP Office Action for Patent Application No. 2008-208848 dated Oct. 5, 2011.

(Continued)

*Primary Examiner* — Ramsey Zacharia
(74) *Attorney, Agent, or Firm* — James C. Abruzzo; Timothy D. Meade

(57) ABSTRACT

The present invention provides chip-resistant powder topcoats for corrosion resistant powder coated steel substrates, such as, for example, automotive suspension coil springs, comprising powder coatings formed from one or more wax and a resin component of one or more toughened epoxy resin. The present invention provides dual coatings of toughened epoxy powder basecoats and topcoats, which may be foamed and/or fiber reinforced. The powder used to form the chip resistant topcoat can further comprise up to 200 phr or, preferably, up to 75 phr of one or more extender, or 0.5 or more phr of one or more extender, such as barium sulfate, while fully retaining its chip resistant properties. In addition, the powder used to form the chip resistant topcoat can be a low temperature curing powder comprising one or more low temperature curing agent. The invention provides methods for making the dual coatings comprising applying to the substrate a toughened, zinc-loaded, epoxy coating powder, applying to the powder coated substrate a wax containing toughened epoxy topcoat and heating to fuse or cure the coating powders.

12 Claims, No Drawings

(56) References Cited

U.S. PATENT DOCUMENTS

| | | | |
|---|---|---|---|
| 6,069,221 A | 5/2000 | Chasser et al. | |
| 6,184,311 B1 | 2/2001 | O'Keeffe et al. | |
| 6,254,751 B1 | 7/2001 | Reiter et al. | |
| 6,270,855 B1* | 8/2001 | Jung et al. | 427/486 |
| 6,284,846 B1 | 9/2001 | Ambrose et al. | |
| 6,294,610 B1 | 9/2001 | Daly et al. | |
| 6,346,292 B1 | 2/2002 | Grubb et al. | |
| 6,403,222 B1* | 6/2002 | Harrison | 428/418 |
| 6,521,706 B1 | 2/2003 | Desai et al. | |
| 6,537,610 B1 | 3/2003 | Springer et al. | |
| 6,663,968 B2 | 12/2003 | Grubb et al. | |
| 6,677,032 B1* | 1/2004 | Grubb et al. | 428/215 |
| 6,770,702 B1 | 8/2004 | Muller et al. | |
| 7,244,780 B1 | 7/2007 | Robinson et al. | |
| 7,473,717 B2 | 1/2009 | Muenz et al. | |
| 8,192,840 B2 | 6/2012 | Kunita et al. | |
| 2001/0046555 A1 | 11/2001 | Lessmeister et al. | |
| 2001/0051227 A1 | 12/2001 | Jung et al. | |
| 2002/0090823 A1 | 7/2002 | Grubb et al. | |
| 2003/0124248 A1 | 7/2003 | Tullos et al. | |
| 2004/0009300 A1 | 1/2004 | Shimakura et al. | |
| 2004/0101670 A1 | 5/2004 | Grubb et al. | |
| 2004/0266899 A1 | 12/2004 | Muenz et al. | |
| 2007/0116963 A1 | 5/2007 | Sakakibara | |
| 2007/0172665 A1 | 7/2007 | Kunita et al. | |
| 2009/0176903 A1 | 7/2009 | Muenz et al. | |
| 2009/0270533 A1 | 10/2009 | Umehara et al. | |
| 2010/0256282 A1 | 10/2010 | Breidenstein et al. | |
| 2010/0297422 A1 | 11/2010 | Lucas | |
| 2012/0258316 A1 | 10/2012 | Lucas | |

FOREIGN PATENT DOCUMENTS

| | | |
|---|---|---|
| CN | 10103364 A | 9/2007 |
| CN | 101952374 A | 1/2011 |
| DE | 3018765 A1 | 11/1981 |
| DE | 10020481 A1 | 10/2001 |
| EP | 0 040 243 B1 | 11/1981 |
| EP | 0 440 292 A3 | 8/1991 |
| EP | 0 500 009 A1 | 8/1992 |
| EP | 0 525 870 A1 | 2/1993 |
| EP | 0 292 771 B1 | 3/1993 |
| EP | 0 631 536 B1 | 12/1996 |
| EP | 0 846 710 A1 | 6/1998 |
| EP | 0 882 101 B1 | 12/1998 |
| EP | 0 994 141 A2 | 4/2000 |
| EP | 1 726 621 A1 | 5/2005 |
| EP | 1 972 672 A2 | 3/2008 |
| GB | 1 407 851 | 9/1975 |
| GB | 1 565 379 | 4/1980 |
| JP | 49-039625 | 4/1974 |
| JP | 58-114766 | 7/1983 |
| JP | 58-114767 | 7/1983 |
| JP | 58-168619 | 10/1983 |
| JP | 59-29154 | 2/1984 |
| JP | 59-193970 | 11/1984 |
| JP | 61-148274 | 7/1986 |
| JP | 3-785 A | 1/1991 |
| JP | 3-170523 A | 7/1991 |
| JP | 6-9903 | 1/1994 |
| JP | 6-32995 | 11/1994 |
| JP | 7-26119 A | 1/1995 |
| JP | 7-216297 | 8/1995 |
| JP | 8-10686 | 1/1996 |
| JP | 9-12926 A | 1/1997 |
| JP | 9-272820 | 10/1997 |
| JP | 11-188309 | 7/1999 |
| JP | 2000-143938 A | 5/2000 |
| JP | 2000-176373 | 6/2000 |
| JP | 2000-190422 A | 7/2000 |
| JP | 2002-105393 | 4/2002 |
| JP | 2003-286435 A | 10/2003 |
| JP | 2004-352994 | 12/2004 |
| JP | 2006-96905 A | 4/2006 |
| JP | 2006-96928 A | 4/2006 |
| JP | 2007-314712 | 6/2007 |
| JP | 4020557 | 10/2007 |
| JP | 2007-313475 | 12/2007 |
| JP | 2007-314762 | 12/2007 |
| WO | WO 91/14745 | 10/1991 |
| WO | WO 92/11324 A1 | 7/1992 |
| WO | WO 93/17851 | 9/1993 |
| WO | WO 00/55268 | 9/2000 |
| WO | WO 03/093375 A1 | 11/2003 |
| WO | WO 2005/028580 A2 | 3/2005 |
| WO | WO 2006/005136 A1 | 1/2006 |
| WO | WO 2006/038491 A1 | 4/2006 |
| WO | WO 2007/025007 A1 | 3/2007 |
| WO | WO 2007/138396 A1 | 12/2007 |
| WO | WO 2009/129088 A1 | 10/2009 |

OTHER PUBLICATIONS

European Search Report for European Application No. 08003475.4 dated Jul. 2, 2008.
International Preliminary Report on Patentability for International Application No. PCT/EP2009/050738 dated Feb. 8, 2010.
International Search Report for International Application No. PCT/EP2009/050738 dated May 8, 2009.
Written Opinion for International Application No. PCT/EP2009/050738 dated May 8, 2009.
Abstract of JP 3-785 A dated Jan. 7, 1991 from Questel QPAT.
Abstract of JP 3-170523 A dated Jul. 24, 1991 from Questel QPAT.
Abstract of JP 7-26119 A dated Jan. 27, 1995 from Questel QPAT.
Abstract of JP 9-12926 A dated Jan. 14, 1997 from Questel QPAT.
Abstract of JP 2000-143938 A dated May 26, 2000 from Questel QPAT.
Abstract of JP 2003-286435 A dated Oct. 10, 2003 from Questel QPAT.
Abstract of JP 2006-96905 A dated Apr. 13, 2006 from Questel QPAT.
Abstract of JP 2006-96928 A dated Apr. 13, 2006 from Questel QPAT.
Fox in Bull. Amer. Physics. Soc., 1, 3, pp. 122-123 (1956).
Powder Coatings, "Elastomer-Modified Epoxy Powder Coatings: a Review," vol. 184, No. 4347, pp. 151-154 (Apr. 12, 1994).
Dow Chemical Company in Polymer Reprints, 32 (3), pp. 358-359 by H-J Sue and E. I. Garcia-Melfin (Aug. 1991).
Derwent Abstract of JP 58-114766 A.
Chinese Office Action dated Jan. 31, 2011.
Jianghai et al., "Polymer Wax and the Use thereof in Powder Coatings," English Translation, pp. 1-5.
Rothenberg, "Paint Additives, Recent Developments" pp. 175-177.
English Translation for German Patent No. DE 10020481 A1.
English Translation for German Patent No. DE 3018765 A1.
English Abstract for Japanese Patent No. JP 59-029154.
English translation of Japanses Office Action dated Jul. 24, 2012 (ACO6484JPP1).
English Abstract of JP 2002-105393.
English Abstract of JP 2007-314762.
International Search Report for Application No. PCT/EP2010/060907; Completion Date: Mar. 11, 2011.
English translation of Chinese Office Action dated Dec. 15, 2011.
Alger, Polymer Science Dictionary, 2nd Edition, pp. 5-6, Apr. 1999.
Encyclopedia of Polymer Science and Engineering, vol. 3, Coating Methods: Powder Coating pp. 552, 575-577.
Encyclopedia of Polymer Science and Engineering, vol. 6, Epoxy Resins: Fillers, pp. 362-363, 1985.
H.J. Sue, et al., "Toughening of High Performance Epoxies Using Designed Core-Shell Rubber Particles", Polymer Reprints, 32 (3), pp. 358-359.
NERAC (computerized literature search) performed by Jeffrey Casavant, Sep. 29, 1998.
Shell Chemicals Systems & Solutions Newsletter, Jul. 2000—see p. 2.
Dow Epoxy Powder Coatings: Hardeners Oct. 2001—see p. 2.
General Motors Published Test, Chip Resistance of Coating, GM 9508P, Jul. 1991.

(56) References Cited

OTHER PUBLICATIONS

General Motors Published Test, Scab Corrosion Creepback of Elpo Paint Systems on Metal Substrates, GM 9511P, Oct. 1986.
General Motors Published Test, CASS—Copper Accelerated Acetic Acid Salt Spray Test, GM 4476P, Nov. 1988.
GCA Newsletter, "Kukdo's New Products" (Relates to KR-600 series Acrylic Rubber Modified Epoxy).
Ralph Drake, "Elastomer-Modified Epoxy Powder Coatings: A Review", Powder Coatings, 184 No. 4347, Apr. 13, 1994, pp. 151-154.
Derwent English Abstract for JP Publication No. 06-329955.
Derwent English Abstract for JP Publication No. 49-039625.
Derwent English Abstract for JP Publication No. 58-168619.
Derwent English Abstract for JP Publication No. 59-193970.
Derwent English Abstract for JP Publication No. 58-114766.
QPatent English Abstract for Chinese Patent Publication 101033364 A.
English Patent Abstract for JP Publication No. 2000-190422.
Orbit English Machine Translation for JP Publication No. 11-188309.
Orbit English Machine Translation for JP Publication No. 9-272820.
Orbit English Abstract for JP Publication No. 61-148274.
QPatent English Abstract for JP Patent Publication 6-009903 A.
QPatent English Abstract for JP Patent Publication 8-010686 A.
QPatent English Abstract for JP Patent Publication 2004-352994 A.
Derwent English Abstract for JP Publication No. 4020557.
English Abstract of JP07-216297.
English Abstract of JP58-114767.
English Abstract of JP 2000-176373.
English Translation of Japanese Patent Application No. 2012-522155 Office Action dated Jul. 16, 2013.

\* cited by examiner

THIN CHIP RESISTANT POWDER TOPCOATS FOR STEEL

This application claims the benefit of priority under 35 U.S.C. §119(e) of U.S. Provisional Patent Application No. 61/001,168 filed on Oct. 31, 2007.

The present invention relates to coating powders for chip resistant topcoats and powder coating topcoats for steel substrates. More particularly, the present invention relates to coating powders for chip resistant topcoats on which comprise toughened epoxy resin and one or more wax compounds and the chip resistant coatings on hi-tensile steel substrates that are made therewith, such as, for example, automotive suspension coil springs.

Steel coil springs in the wheel assemblies of automobiles and other vehicles are subjected to very demanding conditions. Because conventional steel springs were expected to rust, to allow for such rusting, conventional coil springs were formed of appropriately thick steel. However, to improve the steering and ride control of automobiles, the wheel assemblies were moved outward, toward the corners of the vehicle. This increased torsional stress on the automobile body structure; and this stress must be nullified using a stronger frame assembly or weight reduction of the suspension components moved toward the corners. Reduced diameter, high tensile steel, coil springs weigh less than conventional automotive suspension coil springs, so they offer means to reduce the weight of these components. Moreover, super high tensile steel offers the promise of further weight reduction. However, high tensile steel coil springs are scratch and notch sensitive, so they require protection from impact damage caused by flying stones and gravel encountered during driving on paved or unpaved roads. Also, to maintain desired metallurgical properties and prevent premature flex damage failure, the high tensile steel cannot be heated beyond 163° C.

U.S. Pat. No. 6,677,032 B1, to Grubb et al. discloses a dual layer coating including a zinc-rich, toughened epoxy basecoat which provides corrosion-resistance and a zinc-free topcoat of the same thermoset epoxy resin which provides chip-resistance. While the toughened coatings for high tensile steel could be processed with a single heat cycle, the thickness of the topcoats disclosed therein added to the cost of a coating that would meet an automotive OEM Chip Resistant Coating Test.

The present inventors seek to solve the problem of providing chip resistant powder coatings for steel, especially high tensile steel, while providing thinner and/or more economical topcoats therefore.

STATEMENT OF THE INVENTION

In accordance with the invention, chip-resistant powder topcoats for substrates having one or more corrosion resistant powder coating basecoats thereon comprise the cured or fused product of a coating powder of a resin component of one or more toughened epoxy resin, from 0.1 to 5 parts per hundred parts resin (phr) of one or more wax and, optionally, up to 200 phr of one or more extender. The topcoats comprise the cured or fused product of powders preferably having up to 75 phr of one or more extender, or, 0.1 or more phr, or, 0.5 or more phr of one or more extender, such as barium sulfate, while fully retaining their chip resistant properties. The powder used to form the chip resistant topcoat can be a low temperature curing powder e.g. one that cures at temperatures of from 100 to 163° C. in a period of 45 minutes or less, preferably 30 minutes or less and comprising one or more low temperature curing agent. Suitable low temperature curing agents may be, for example, epoxy adducts of an aliphatic polyamines, epoxy adducts of cycloaliphatic polyamines, epoxy adducts of imidazoles, and mixtures thereof.

The corrosion-resistant basecoat powder coating in contact with the steel substrates comprises one or more corrosion resistant toughened resin powder coating, e.g. from zinc loaded epoxy resin powder, urethane powders, or highly crosslinked epoxy powder.

Preferably, the substrates for the topcoats comprise corrosion resistant powder coated high tensile steel, i.e. the steel having a corrosion resistant toughened epoxy powder coating. The invention provides chip resistant powder coatings for steel substrates, wherein the basecoat powder coating has a thickness of from 25 to 103 μm and the topcoat has a thickness of from 150 to 400 μm, preferably 384 μm or less, or, more preferably 335 μm or less. The topcoats can be foamed or fiber reinforced, or both.

The one or more wax in the topcoat or coating powder therefore may be any wax giving a slip test tangent value of 0.335 or lower (ASTM D 4518-85 (1985). Suitable waxes may be chosen from polyethylene (PE) wax, microcrystalline PE wax, high molecular weight PE wax, polytetrafluoroethylene (PTFE) waxes, hydrogenated castor oil, PTFE combinations with $TiO_2$, partially chlorinated Paraffin resins, e.g. 70% chlorinated paraffin resins, PE/PTFE combinations, waxes containing organosiloxanes, and mixtures thereof. Preferably, the wax comprises a PE/PTFE combination, or, more preferably a PE/PTFE combination wherein the ration of PE to PTFE is 1:1 to 3.0:1.0, for example, from 1.1:0.9 to 2.0:1.0. The one or more wax may be used in amounts of from 0.1 or more phr, to 5.0 phr, preferably 3.0 phr or less, more preferably, 2.5 phr or less.

The present invention provides dual coatings on steel substrates wherein the basecoat comprises toughened, zinc-loaded epoxies having a thickness of from 25 to 103 μm and the zinc-free topcoat is foamed and comprises the same toughened epoxy as the basecoat and one or more wax, and has a thickness of from 150 to 400 μm thick.

Dual coatings may preferably be made by "dry on dry" methods processed in a single heating cycle. In the methods, toughened, zinc-loaded, epoxy basecoat coating powders are applied, e.g., electrostatically, to the steel substrate, in an amount sufficient to form a basecoat of desired thickness. The coating powder for the topcoat is applied in an amount sufficient to form a topcoat of desired thickness. Then the powder coated substrate is heated to fuse or cure the coating powders, thereby producing the dual coating. The same toughened epoxy resin is preferably used to form both the basecoat and topcoat, so that the heating cycle produces a structure in which the two layers are integrally bonded to each other through the cross-linking of the epoxy resins of each layer.

All phrases comprising parenthesis denote either or both of the included parenthetical matter and its absence. For example, the phrase "(co)polymer" includes, in the alternative, polymer, copolymer and mixtures thereof.

Unless otherwise noted, all processes refer to and all examples were performed under conditions of standard temperature and pressure (STP).

All ranges cited herein are inclusive and combinable. For example, if an ingredient may be present in amounts of 4 wt. % or more, or 10 wt. % or more, and in amounts up to 25 wt. %, then that ingredient may be present in amounts of 4 to 10 wt. %, 4 to 25 wt. % or 10 to 25 wt. %.

As used herein, the term "average particle size" shall mean, unless otherwise indicated, the particle diameter or the largest dimension of a particle in a distribution of particles as determined by laser light scattering using a Malvern Mastersizer™

2000 instrument (Malvern Instruments Inc., Southboro, Mass.) per manufacturer's recommended procedures.

As used herein, unless otherwise indicated, the term, the "Chip Resistant Coating Test" refers to General Motor's", GM published test no. GM9508P, Method B (revised, June 2002).

As used herein, the phrase "coating powder" refers to a powder coating composition and the phrase "powder coating" refers to a coating formed from a powder coating composition.

As used herein, the term "copolymer" shall mean any polymer made from two or more different monomers.

As used herein, unless otherwise indicated, the term "glass transition temperature" or "Tg" of any resin or (co)polymer is measured using differential scanning calorimetry (DSC) (rate of heating of 20° C. per minute), the $T_g$ being taken at the midpoint of the inflection. $T_g$ may alternatively be calculated as described by Fox in Bull. Amer. Physics. Soc., 1, 3, page 123 (1956).

As used herein, the term "high tensile steel" includes, for example, steel that in the form of prestressed or prestressing strands exhibits an ultimate tensile strength of 1850 MPa or higher at 25° C., and includes super high tensile steel.

As used herein, the term "hybrid" of any (co)polymer or resin shall refer to adducts, grafts or block copolymers and compatible or compatibilized blends of such (co)polymers or resins, such as epoxy polyester hybrids.

As used herein, unless otherwise indicated, the term "molecular weight" refers to the weight average molecular weight of a polymer as measured by gel permeation chromatography (GPC) calibrated with polystyrene standards.

As used herein, the term "phr" means the amount, by weight, of an ingredient per hundred parts, by weight, of the resin system. Thus, amounts of any other material, such as powdered zinc, glass, aramid or carbon fibers, blowing agents, etc. are expressed as parts per hundred by weight relative to the resin system calculated as 100 parts.

As used herein, the term "polymer" includes polymers that are the reaction product of any number of different monomers, such as terpolymers, and tetra polymers, and, further, includes random, block, segmented and graft copolymers, and any mixture or combination thereof.

As used herein, the terms "resin" and "polymer" are interchangeable.

As used herein, the term "resin system" refers to the total of epoxy resin, toughening resin and any crosslinker, curing agent or hardener (but not catalyst) which becomes an integral part of the cross-linked structure.

As used herein, the term "slip test" refers to a test that provides the tangent of inclination at the angle at which a 7.68 cm×10.24 cm plastic sled having a mass of approximately 500 g and placed at one end of a coated panel begins to slide as the end of the panel is slowly raised by hand from the end on which the sled is placed. The coated panel is raised just until sled starts to move. The angle is then measured by hand with a protractor. The coated panel comprises a 10.24 cm×30.72 cm (4"×12") Q panel (cold rolled steel) coated with a powder comprising triglycidyl isocyanurate (TGIC) cured polyester and 2.0 phr of the wax, which is applied by electrostatic spray to a thickness of 51.2 μm (2.0 mil), with up to a 5.12 μm (0.2 mil) variation in thickness, and then cured at 190.6° C. (375° F.) for 35 min. The slip test is defined by ASTM D 4518-85 (1985) using the sled as defined herein.

As used herein, the term "wt. %" refers to weight %.

Herein, unless otherwise noted, all percentages are by weight.

The chip resistant dual coating of the present invention surprisingly enables a much thinner coating to meet the Chip Resistant Coating test. While the basecoat may comprises a zinc-loaded crosslinked powder coating, the topcoat comprises one or more wax and a zinc-free, foamed toughened epoxy powder coating. Using the powder coatings of the present invention, one can retain the chip resistance of powder coatings so as to meet current requirements for high tensile steel springs while reducing the topcoat thickness by as much as 40% or while adding as much as 200 phr, preferably up to 75 phr, of extender or filler, such as barium sulfate, titanium dioxide, iron oxides, crystalline silica (quartz), calcium metasilicate, soda lime glass spheres, magnesium silicate, nepheline syenite, muscovite mica, diatomaceous earth, kaolin clay or calcium carbonate.

Toughened epoxy resins for the basecoat and the topcoat may comprise tougheners chosen from epoxy adducts of from 5 to 25 wt. %, based on total weight of the epoxy component and the elastomer component, of one or more elastomer having a glass transition temperature ($T_g$) of −30° C. or below, preferably −40° C. or below; core-shell polymers having an epoxy shell and from 5 to 20 wt. % of a soft rubber core, based on total of epoxy shell and acrylic rubber core, the core having a $T_g$ of −30° C. or less, preferably −40° C. or less; multi-hydroxy functional curing agents having a hydroxyl equivalent weight of from 200 to 550; and mixtures and combinations thereof.

In the zinc-loaded basecoat, the toughened coating powder may preferably comprise 75 phr of zinc powder, or, preferably 150 or more phr, and, more preferably, 200 phr or more of zinc powder. The cured resin in the basecoat can be any crosslinked resin or polymer, preferably epoxy.

In the topcoat, the toughened epoxy resins may be further toughened to provide greater chip resistance. One method of further toughening the topcoat is to add fibers to the outer coat formed of a material which does not melt or degrade at the processing temperatures to which the coating powder is subjected, such as, for example, glass, aramid, metal or carbon. Useful fibers have diameters between about 5 and about 20 μm, and are used at between about 20 and about 80 phr of the resin used to form the outer coat. Another method of further toughening the topcoat is to add a blowing agent to the outer coat resin such that when processed, the density of the outer coat is reduced by at least about 25%, preferably at least 40% relative to theoretical density. Above about 65% reduction in density, the coating becomes weakened. The foaming provides porosity to the outer coating which when struck by material such as gravel may be dented, but will not fracture. The resin of the outer coat may be further toughened by both the addition of fibers as well as by foaming through use of a blowing agent.

Preferably, the steel substrates are pre-treated with anti-corrosive pretreatments, e.g. zinc phosphate.

The one or more epoxy resin may be chosen from those known in the art to be useful for coating powders, such as, for example, those produced by the reaction of epichlorohydrin or polyglycidyl ether and an aromatic polyol such as bisphenol, e.g., bisphenol A. The epoxy resin should have an average epoxy functionality greater than 1.0 and more preferably greater than 1.9. Generally the epoxy equivalent weight should be at least 170, but lower values may be possible in some cases; for example it may be 100 or more. Preferably the epoxy equivalent weight is less than 3000, or 1000 or less, for example from 170 to 1500, or, especially from 750 to 975. Such epoxy resins may be produced, for example, by an etherification reaction between an aromatic or aliphatic polyol and epichlorohydrin or dichlorohydrin in the presence of an alkali such as caustic soda. The aromatic polyol may be, for example, bis(4-hydroxyphenyl)-2,2-propane (i.e. bisphenol A), bis(4-hydroxyphenyl)-1,1-ethane, bis(4-hydroxyphenyl)-1,1-isobutane, bis(4-hydroxy-t-butylphenyl)-2,2-propane, bis(2-hydroxynaphthyl)methane, 4,4'-dihdyroxybenzophenone or 1,5-pentanediol, 1,6-hexanediol, aliphatic glycols and diglycols, diglycidyl ethers of diols, and condensed glycidyl ethers of such diols, can be used. Suitable resins are exemplified by, but not limited to, those produced by the reaction of epichlorohydrin and a bisphenol, e.g., bisphenol A and bisphenol F. The low melt viscosities of these resins facilitate the extrusion of them in admixture with a curing agent, additives and pigments at 60 to 110° C. Preferably, epoxy resins for use in the present invention comprising the etherification residue of bisphenol A. Suitable epoxy resins may comprise, for example, Araldite™ GT 7074, a diglycidyl ether of bisphenol A epoxy resin with a weight per epoxide (EEW) of from 930 to 1180 that is commercially available from Huntsman Advanced Materials Americas Inc. Brewster, N.Y.

Coating powder compositions may comprise epoxy hybrid coating powders. Useful oxirane group-containing polymers as epoxy resins in hybrid coating powders may include polyglycidyl-functional acrylic polymers, epoxy novolak resins, or the reaction product of carboxyl functional polyesters and epoxy resins.

Thermosetting epoxy resins may contain either one or more curing agent, such as a polyamine compound, or a cure catalyst to effect auto-cross-linking of the epoxy resin, or both. Preferably, the curing agent comprises a low temperature curing agent such as, for example, epoxy adducts of an aliphatic or cycloaliphatic polyamine and epoxy adducts of an imidazole. Low temperature curing agents provide coating powders that cure at 149° C. or less in a period of 30 minutes; such coatings may cure, for example, at 135° C. in 30 minutes; or they may cure at temperatures of less than 149° C. in under 120 minutes, for example, at a temperature of 121° C. in 40 minutes.

Epoxy adducts of polyamines, may include, for example, epoxy adducts of aliphatic disecondary diamines, aliphatic diprimary diamines, cycloaliphatic diamines and aromatic diamines. Such compounds may be used in amounts ranging from 2 to 40 parts per hundred parts of the resin (phr), preferably, from 5 to 20 phr.

Preferred catalysts are imidazoles, the imidazoles having the general formula:

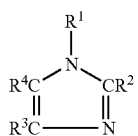

wherein $R^1$, $R^2$, $R^3$, and $R^4$ are independently hydrogen, alkyl, aryl, or any substituent which is not reactive with the epoxy resin. For the purposes of this invention, the term imidazole is used herein to mean both the substituted and unsubstituted imidazoles. Catalysts may be used at levels of from 0.1 to 5 parts per hundred parts of the resin (phr), preferably 0.2 to 2 phr to accelerate the curing reaction with the low temperature curing agent.

Preferably, low temperature curing agents comprise epoxy adducts of imidazoles, for example, bisphenol A epoxy resin adducts of imidazoles. Epoxy adducts make imidazoles more compatible with epoxy resin systems. Epoxy adducts of imidazoles may be used at a level of from 0.1 to 8.0 parts per hundred parts of the resin (phr), preferably 1.0 to 5 phr. Suitable adducts of such imidazoles with a bisphenol A epoxy resin are available commercially from Shell Chemical Company as Epon™ Curing Agent P-101, an imidazole adduct of a diglycidyl ether of bisphenol A epoxy resin, commercially available from Resolution Performance Products Houston, Tex.

In accordance with the first epoxy-toughening method described above, epoxy resins, preferably bisphenol A resins, are adducted to elastomers having a $T_g$ of −30° C. or below, preferably −40° C. or below. The preferred elastomer is carboxyl-terminated butadiene/acrylonitrile (CTBN) rubber. Such epoxy/CTBN rubber adducts are described, for example, in U.K. Patent Specification 1,407,851 (C. G. Taylor) published Sep. 24, 1975 and Powder Coatings.184 "Elastomer-Modified Epoxy Powder Coatings: a Review", Apr. 13, 1994, No. 4347. To provide the necessary flexibilizing for cold-temperature chip resistance, the CTBN component should be present in amounts of 5 wt % or more of the total weight of the CTBN and the epoxy resin components and up to 25 wt % of the CTBN and epoxy resin. Above 25 wt % of CTBN, no further benefit is realized and there may be insufficient epoxy component for a good cure. The elastomer component and epoxy component are chemically bound so that phase separation does not occur during fusion and curing of the coating powder. However, there remain microdomains of epoxy and rubber.

In a second toughening method, one or more core/shell resin is used in which an acrylic rubber resin forms the core and the epoxy resin, preferably a bisphenol A epoxy resin, forms the shell. Chemical bonding between the carboxylic functionality of the acrylic rubber resin of the core and the epoxy resin of the shell prevents phase separation during fusion and curing of the coating powder formed using the core/shell resin. Such acrylic rubber modified epoxies are described, for example, by Dow Chemical Company in Polymer Reprints, 32 (3) pp. 358-9 by H-J Sue and E. I. Garcia-Melfin. Preferred core-shell polymers have acrylic rubber cores having carboxylic acid functionality by which the epoxy resin of the shell is bound, such as acrylic rubbers might be formed from (meth)acrylic acid and alkyl(meth) acrylates, such as butyl acrylate, ethyl acrylate and ethylhexyl (meth)acrylate.

As a third toughening method, the epoxy resin is cured with a polyhydroxyl functionality having a relatively high hydroxy equivalent weight range from 200 to 550, and, preferably, 300 or more. The relatively high hydroxy equivalent weight of the cross-linking agent ensures relatively long chain length between OH groups, which chain lengths provide flexibility to the cured coating, helping to render the coatings chip-resistant. Preferred polyhydroxyl tougheners are phenolic curing agents, such as a bisphenol A end capped diglycidyl ether of bisphenol A, which is the reaction product of a diglycidyl ether of bisphenol A and bisphenol A. Examples of preferred phenolic curing agents for the epoxy resin component includes those sold under the trademarks D.E.H.™ 87 and D.E.H.™ 85 curing agents by Dow Chemical Company, Midland, Mich. both of which are believed to be bisphenol A end capped diglycidyl ethers of bisphenol A.D.E.H.™ 87 curing agent has an hydroxyl equivalent weight of from 370 to 400 and is commercially available from Dow Chemical Company, Midland, Mich.

Other classes of phenolic hardeners can used as well such as phenol- and cresol-novolac curing agents.

Zinc powder is added to provide corrosion resistance, and the Zn also acts as a toughening agent in conjunction with any of the toughened epoxies described above. Accordingly, a single coat of such Zn-rich, toughened epoxy coating can be used to form a single-coat on a high tensile steel component and provide such component with both chip-resistance and corrosion resistance. Zinc powder useful in the invention may have an average particle size of 2.0 to 10.0 μm, for example, 4.0 microns. A suitable zinc powder is Zinc dust 4P16, which is commercially available from Sogem USA Inc., Raleigh, N.C.

Dual coating methods comprise applying a basecoat powder having a thickness of from 25 to 100 μm thick, of zinc-laden, toughened epoxy in contact with the steel substrate and then applying a top coat powder of toughened epoxy which is free of zinc and contains one or more wax. The topcoat may contain reinforcing fibers and/or be foamed through use of a foaming agent. A zinc-free outer coating may both contain fiber and be foamed. If a dual coat coating is formed, it is preferred that the resin composition of the two coats be substantially identical, whereby a generally continuous thermoset resin structure forms with the inner coat being rich in zinc and the outer coat being reinforced by fiber and/or foaming.

If one or more foaming agent is used, it may be either admixed in dry form with the coating powder, i.e. as a post blend, or may be integrally incorporated in the coating powder itself, i.e. as part of intimate or melt mixing. If integrally mixed, the foaming agent is activated at a temperature above that at which the coating powder composition is fused into a coating powder, but at or below the temperature at which the coating powder is fused and cured to coat the high tensile steel. Foaming agents are used at 0.1 phr or more, and up to 5 phr, preferably at least 0.5 phr, the actual amount depending upon the particular foaming agent, the particular resin system, the processing conditions and the degree to which density reduction is desired. Depending upon the amount of ingredients in addition to the resin, the foaming agent is used at from 0.1 to 3 wt % of the entire formulation, preferably at least 0.3 wt %.

The foaming coating powders used in the present invention may be used by themselves to coat substrates. In foaming coating powders, it is desirable to avoid out-gassing, e.g., out-gassing of water, which produce pinholes and detract from the appearance of the coating. However, in accordance with one aspect of the present invention, functional advantages are found for coating powders which produce a foamed coating. While a foamed coating is described above as a top coat in respect for a dual-coating for high tensile steel, a foamed coating may be used by itself for impact resistance on high tensile steel substrates where the requirements are less stringent.

Foamed coatings also provide both thermal and acoustical insulation for steel substrates. Thus, for example, a foamed coating might be used to coat an automotive oil pan or on the interior of automotive door panels to dampen vibration.

Foamed coatings used in the present invention indent or crush when impacted. One application for such a crushable foamed coating is in the area of providing the appearance of very minimal tolerance between component parts where manufacturing requirements allow for a greater tolerance. For example, foamed coatings on the door and door jam of a hotel safe will crush to form the appearance of an extremely tight fit even if the actual tolerance is greater.

Blowing or foaming agents are selected according to the differences in temperatures at which a given coating powder is compounded and the temperature at which the coating powder is fused and cured. Such agents are selected so as not to foam during the intimate mixing of the materials to form the coating powder, for example, at a temperature of from 60° C. to 110° C. for epoxy coating powders, but produce significant gas for foaming at the curing temperature of the coating powder, at 120° C. or above, for example, 150° C. or above, or up to 275° C.

A currently preferred heat-activated foaming agent for epoxy coatings is p-toluene sulfonyl hydrazide, such as that sold as Celogen™ TSH sold by Uniroyal Chemical Company, Middelbury, Conn. Other suitable blowing agents include, but are not limited to 2,2'-azobisisobutyro nitrile, dinitroso-pentamethylenetetramine, sodium bicarbonate, ammonium carbonate, silicon oxyhydride and azocarbonamide.

Chemical foaming agents such as sodium borohydride may be used to produce foaming. To foam, sodium borohydride requires a proton donor, such as water. The use in plastics of salt hydrates in conjunction with alkali metal borohydrides produces foaming at elevated temperature, the salt hydrate only releasing water above a certain threshold temperature. For epoxy-based coating powders, the combination of sodium borohydride and alumina trihydrate is a useful combination of foaming agent and proton donor.

Alternatively, foamed coatings can be produced wherein two chemical components produce gas by preparing a dry blend of two coating powders, one of which contains one of the chemical components and the other of which contains the other chemical component. For example, an epoxy coating powder containing sodium borohydride might be dry-blended with an acrylic coating powder containing carboxylic acid functional acrylic polymers. When fused and cured, the carboxylic acid functionality of the acrylic coating powder will contribute the protons for foaming the sodium borohydride.

The coating powders useful in the invention may also incorporate minor components known in the art, e.g., pigments, and flow control agents such as silica. One suitable commercially available pigment, also an extender, comprises Raven #1250 beads, a carbon black pigment available from Columbian Chemical Co., Atlanta, Ga.

Coating powders used to provide the chip-resistant and corrosion-resistant coatings of the present invention are produced according to conventional methods. The components may be blended, and then melt-compounded so that no significant curing occurs. The molten compound may be extruded, and after extrusion, rapidly cooled, followed by grinding and, as necessary, sorting the particulates according to size.

The coating powders may be applied via conventional means. For electrostatic coating, the average size of the particles may range from 5 to 200 μm, preferably 25 μm or more, or, 75 μm or less.

Once applied the coatings are cured thermally, for example, at temperatures of from 90 to 250° C. for a period of from 30 seconds to 90 minutes. Heat for thermal cure may come from a convection, infrared (IR) or near IR source.

The following examples illustrate the utility of the present invention.

In the following examples, "Araldite™ GT 7226/9808 resin Master Batch" refers to an epoxy resin containing 90 wt % of a diglycidyl ether of bisphenol A epoxy resin with a weight per epoxide of from 795 and 895 and 10 wt % of Acronal™4F acrylic flow modifier. The master batch is commercially available from Huntsman Advanced Materials Americas Inc., Brewster, N.Y. Cab-O-Sil™ M5 is a fumed silica, commercially available from Cabot Corporation, Tuscola, Ill. The ingredient, 737 BC is milled e-glass fibers, or chopped fibre glass, is commercially available from Owens Corning, Toledo, Ohio.

FORMULATIONS

Examples A and B and Examples 1A-6A

Each of basecoat and topcoat coating powders were formed from the ingredients listed in the following Table 1 according to a method wherein the raw ingredients were blended by shaking them in a plastic bag for about 1 min, then extruded for a short time (60-90 sec) in a Prism Twin Screw TSE 24PC extruder set at 71.1° C. (160° F.) into sheets, which were air cooled on a belt and broken into chips. The resulting chips are mixed for about 1 minute in a plastic bag with dry flow aid in the amount indicated and then ground at high speed in a Brinkman Retsch ZM 1000 Laboratory Grinder to a powder, and then screened using an 135 μm (100 mesh) screen to remove coarse particles.

Coatings

Examples 1-9

The resulting epoxy basecoat and topcoat powder coating compositions were then electrostatically sprayed one by one, dry on dry, with a Nordson Versa-Spray II electrostatic spray gun onto the substrates indicated in Tables 2 and 3, below, each of which were preheated for 4 min at 160° C. to a surface temperature of approximately 104° C. to achieve the coating powder thicknesses indicated in Tables 2 and 3, below. The resulting dual coatings and were then cured for 20 min at 160° C. in a forced air electric oven to form powder coatings.

In Examples 1-6, 10.24 cm×30.72 cm×1.54 cm (4"×12"×0.6") zinc phosphate pretreated Q panels (cold rolled steel panels) were coated in the manner described above with basecoat of Example A at an average thickness of 51.2 μm±5.12 μm (an average of 2.0 to 2.2 mils) and with the topcoat indicated in Table 2, below, and at an average thickness, as indicated in Table 2, below, of 230.4 μm±5.12 μm (9.0 mils, ±0.2 mils), 307.2 μm±5.12 μm (12.0 mils, ±0.2 mils) and/or 384 μm±5.12 μm (15.0 mils, ±0.2 mils).

In Examples 7-9 (Springs), zinc phosphate pretreated 7.68 cm×1.28 cm (3.0" L×0.5" W) outside curve sections of high tensile automotive suspension coils were coated with the basecoat of Example A at an average basecoat thickness of 51.2 μm±5.12 μm (2.0 mil±0.2 mil), and with topcoats indicated in Table 3, below, and an average topcoat thickness as indicated in Table 3, below.

Gravelometer Testing:

Powder coatings were tested for chip resistance according to Gravelometer method GM9508P, Method B, at −30° C., as follows:

In Examples 1-6, the tests were performed in duplicate and are shown in Table 2, below, showing Gravelometer ratings of 1 to 9. The rating of 1 to 9 was determined by comparison of the test panel to reference panels 1 to 9 and determination of closest matching reference panel. Reference panels 1 to 9 are photographs found at the of the GM Specification showing results of reference panels exposed to Gravelometer; 1 is the worst rated panel with the most amount of chips, and 9 meets the performance specification, having the fewest chips.

In Examples 7-9, the tests were performed in duplicate and are shown in Table 3, below, showing as Gravelometer results the number of impacts to each substrate spring section as counted for each test. For example, a rating of 1/1 means that in each test event, one impact ding, hole or visible evidence of a chip was found on the substrate springin each of two test events; a rating of 5/8 means that 5 "dings" were found on the substrate spring in one test and 8 "dings were found in the repeat or duplicate test. A rating of 0/0 was the best possible rating for the spring "ding" test.

Example A

Basecoat Formulation

| Ingredient | phr |
|---|---|
| Diglycidyl ether of bisphenol A epoxy resin: EEW* from 930 to 1180 | 92.0 |
| Imidazole adduct of diglycidyl ether of bisphenol A epoxy resin | 3.0 |
| Carbon black pigment | 3.0 |
| Bisphenol A end capped diglycidyl ether of bisphenol A, with hydroxyl equivalent weight of from 370 to 400 | 20.8 |
| Elemental Zinc powder | 250.0 |
| Araldite GT 7226/9808 Master Batch | 8.0 |
| Post-Blend (dry flow aid) | % |
| Cab-O-Sil ™ M5 fume silica | 0.3 |

*EEW: Epoxy Equivalent Weight

Comparative Example B

Foamed and Fiber Reinforced Topcoat Formulation

| Ingredient | phr |
|---|---|
| Diglycidyl ether of bisphenol A epoxy resin: EEW of 930 to 1180 | 92.0 |
| Cab-O-Sil ™ M5 fume silica | 0.75 |
| ¹Complex fatty ester (antistatic) | 3.0 |
| Imidazole adduct of diglycidyl ether of bisphenol A epoxy resin | 3.0 |
| Carbon black pigment | 2.0 |
| p-Toluene sulfonyl hydrazide blowing agent | 1.35 |
| Bisphenol A end capped diglycidyl ether of bisphenol A, with hydroxyl equivalent weight of from 370 to 400 | 20.8 |
| 737 BC Milled fibers | 50.0 |
| Araldite GT 7226/9808 Master Batch | 8.0 |
| Post-Blend (dry flow aid) | % |
| Cab-O-Sil ™ M5 fume silica | 0.20 |

¹Texaquart ™ 900, Cognis Corporation, Cincinnati, OH.

TABLE 1

Topcoat Formulations

| | Example | | | | | |
|---|---|---|---|---|---|---|
| Ingredient | 1A Comp | 2A Comp | 3A phr | 4A | 5A | 6A |
| Diglycidyl ether of bisphenol A epoxy resin (EEW from 930 to | 92.0 | 92.0 | 92.0 | 92.0 | 92.0 | 92.0 |

TABLE 1-continued

Topcoat Formulations

| Ingredient | 1A Comp | 2A Comp | 3A phr | 4A | 5A | 6A |
|---|---|---|---|---|---|---|
| 1180) | | | | | | |
| Cab-O-Sil ™ M5 fume silica | 0.75 | 0.75 | 0.75 | 0.75 | 0.75 | 0.75 |
| [1]Complex fatty ester (antistatic) | 3.0 | 3.0 | 3.0 | 3.0 | 3.0 | 3.0 |
| Imidazole adduct of diglycidyl ether of bisphenol A epoxy resin | 3.0 | 3.0 | 3.0 | 3.0 | 3.0 | 3.0 |
| Carbon black pigment | 2.0 | 2.0 | 2.0 | 2.0 | 2.0 | 2.0 |
| p-Toluene sulfonyl hydrazide blowing agent | 1.35 | 1.35 | 1.35 | 1.35 | 1.35 | 1.35 |
| Bisphenol A end capped diglycidyl ether of bisphenol A: Hydroxyl equivalent weight from 370 to 400 | 20.8 | 20.8 | 20.8 | 20.8 | 20.8 | 20.8 |
| 737 BC Milled fibers | 50.0 | 50.0 | 50.0 | 50.0 | 50.0 | — |
| Araldite GT ™ 7226/9808 Master Batch | 8.0 | 8.0 | 8.0 | 8.0 | 8.0 | 8.0 |
| Barium sulfate extender | 50.0 | 75.0 | — | 75.0 | 75.0 | 75.0 |
| Polyethylene (PE) Wax | — | — | 2.0 | 2.0 | 1.3 | 1.3 |
| Polytetrafluorethylene (PTFE) Wax | — | — | — | — | 0.7 | 0.7 |

Post Blend (dry flow aid) %

| | | | | | | |
|---|---|---|---|---|---|---|
| Cab-O-Sil ™ M5 fume silica | 0.20 | 0.20 | 0.20 | 0.20 | 0.20 | 0.20 |

[1]Texaquart ™ 900, Cognis Corporation, Cincinnati, OH.

Example 1A is a comparative topcoat with 50 phr extender. Example 2A is a comparative topcoat with 75 phr extender; Example 3A is a wax containing topcoat with fibers; Example 4A is a wax containing topcoat with 75 phr extender; Example 5A is a PE/PTFE wax combination containing topcoat with 75.0 phr extender; Example 6A is a PE/PTFE wax combination containing with 75.0 phr extender and no fiber.

TABLE 2

Gravelometer Testing Results For Zinc Phosphate Pretreated Q Panels

| Example | Basecoat Formulation, Thickness | Topcoat Formulation, Thickness | Rating |
|---|---|---|---|
| Comparative B1 | A, 51.2 µm +/− 5.12 µm | B, 307.2 µm +/− 5.12 µm | 9/9 |
| Comparative B2 | A, 51.2 µm +/− 5.12 µm | B, 230.4 µm +/− 5.12 µm | 8/8 |
| 1 (comparative) | A, 51.2 µm +/− 5.12 µm | 1A, 307.2 µm +/− 5.12 µm | 8/8 |
| 2 (comparative) | A, 51.2 µm +/− 5.12 µm | 2A, 307.2 µm +/− 5.12 µm | 8/8 |
| 3 | A, 51.2 µm +/− 5.12 µm | 3A, 307.2 µm +/− 5.12 µm | 9/9 |
| 4 | A, 51.2 µm +/− 5.12 µm | 4A, 307.2 µm +/− 5.12 µm | 9/9 |
| 5 | A, 51.2 µm +/− 5.12 µm | 5A, 307.2 µm +/− 5.12 µm | 9/9 |
| 6 | A, 51.2 µm +/− 5.12 µm | 6A, 307.2 µm +/− 5.12 µm | 9/9 |

As shown in Table 2, the results of all inventive examples meet with the automotive OEM specifications. Examples 4, 5 and 6 all show that coatings can be made with low cost extenders without compromising performance. Mean-while, the Comparative Example B2 panels provide unsatisfactory OEM chip resistance performance results of 8/8 when the topcoat is 230.4 µm±5.12 µm (9.0 mil) thick. In Examples 1 and 2, the coating that does not contain wax gives an unsatisfactory rating when the topcoat is 307.2 µm±5.12 µm (12 mils) thick. In Example 3, 2.0 phr of polyethylene (PE) wax added to the coating in Comparative Example B1, the flat panel gave an acceptable rating of 9/9 at a topcoat thickness of 307.2 µm±5.12 µm (12 mils) even though the gravel generally strikes the surface of the panel at a tangent of 0.0, which is less than the tangent slip value of the PE wax (0.331). In Examples 4 and 5, each of the PE wax and combination PE wax/polytetrafluoroethylene (PTFE) wax overcomes the effect of adding extender in Example 2 (comparative), resulting in a satisfactory rating of 9/9 at a topcoat thickness of 307.2 µm±5.12 µm (12 mils). In Example 6, a satisfactory rating of 9/9 at a topcoat thickness of 307.2 µm±5.12 µm (12 mils) results when the reinforcing glass fiber is removed from the topcoat of Example 5.

TABLE 3

Gravelometer Testing Results For Zinc Phosphate Pretreated Coil Spring Sections

| Example | Basecoat Formulation, Thickness | Topcoat Formulation, Thickness | Rating |
|---|---|---|---|
| 7 (comparative) | A, 51.2 µm +/− 5.12 µm | B, 230.4 µm +/− 5.12 µm | 5/8 |
| 8 | A, 51.2 µm +/− 5.12 µm | 3A, 230.4 µm +/− 5.12 µm | 4/5 |
| 9 | A, 51.2 µm +/− 5.12 µm | 6A, 230.4 µm +/− 5.12 µm | 2/2 |

As shown in Table 3, above, Example 7 (Comparative) resulted in 5/8 impacts or "dings" in two tests at a topcoat thickness of 230.4 µm±5.12 µm (9.0 mil). Meanwhile, Addition of PE wax to the topcoat in Example 8 resulted in 4/5 impacts, respectively, to each duplicate substrate at a topcoat thickness of 230.4 µm±5.12 µm (9.0 mil). In Example 9, the addition of a PE/PTFE wax combination to the comparative topcoat in Example 7 resulted in 2/2 impacts, respectively, to each duplicate substrate at a topcoat thickness of 230.4 µm±5.12 µm (9.0 mil), even when 75 phr extender was added, and the reinforcing glass fibers were removed. The results suggest that adding one or more wax to dual coatings for hi-tensile steel, e.g. automotive coil springs, allows retention of chip resistance performance in relatively thinner coatings and even thinner coatings with low cost extenders.

What is claimed is:

1. A chip-resistant powder topcoat on a steel substrate having a corrosion resistant powder coating basecoat thereon, the topcoat comprising the cured or fused product of a coating powder of:
   one or more resin component of one or more toughened epoxy resin, from 0.1 to 5 parts per hundred parts resin (phr) of one or more wax and from 75 phr to 200 phr of one or more extenders wherein the one or more extenders is selected from the group consisting of barium sulfate, titanium dioxide, iron oxides, crystalline silica (quartz), calcium metasilicate, soda lime glass spheres, magnesium silicate, nepheline syenite, muscovite mica, diatomaceous earth, kaolin clay and calcium carbonate.

2. The chip-resistant powder topcoat as claimed in claim 1, wherein the coating powder further comprises one or more low temperature curing agent chosen from an epoxy adduct of an aliphatic polyamine, an epoxy adduct of a cycloaliphatic polyamine, an epoxy adduct of an imidazole, and mixtures thereof.

3. The chip-resistant powder topcoat as claimed in claim 1, wherein the one or more wax gives a slip test tangent value of 0.35 or lower as determined by ASTM D 4518-85 (1985).

4. The chip-resistant powder topcoat as claimed in claim 1, wherein the one or more wax is chosen from polyethylene (PE) wax, microcrystalline PE wax, high molecular weight PE wax, polytetrafluoroethylene (PTFE) waxes, hydrogenated castor oil, PTFE combinations with $TiO_2$, partially chlorinated Paraffin resins, e.g. 70% chlorinated paraffin resins, PE/PTFE combinations, waxes containing organosiloxanes, and mixtures thereof.

5. The chip-resistant powder topcoat as claimed in claim 1, wherein the corrosion resistant basecoat has a thickness of from 25 to 103 μm and the topcoat has a thickness of from 150 to 400 μm.

6. The chip-resistant powder topcoat as claimed in claim 1, wherein the steel substrate comprises corrosion resistant high tensile steel.

7. The chip-resistant powder topcoat as claimed in claim 6, wherein the basecoat comprises one or more zinc loaded, toughened epoxy resin powder.

8. The chip-resistant powder topcoat as claimed in claim 7, wherein the basecoat and the topcoat each comprise the same fused or cured toughened epoxy resin powder.

9. The chip-resistant powder topcoat as claimed in claim 1, wherein the wax comprises a combination of different waxes.

10. The chip-resistant powder topcoat as claimed in claim 1, wherein the one or more extenders is selected from the group consisting of barium sulfate, iron oxides, crystalline silica (quartz), calcium metasilicate, soda lime glass spheres, magnesium silicate, nepheline syenite, diatomaceous earth, kaolin clay and calcium carbonate.

11. The chip-resistant powder topcoat as claimed in claim 10, wherein the one or more extenders is barium sulfate.

12. A method for making a chip-resistant powder dual coating comprising:
   applying to a steel substrate a toughened, zinc-loaded, epoxy coating powder in an amount sufficient to form a basecoat of desired thickness,
   applying to the powder coated substrate a topcoat as claimed in claim 1 in an amount sufficient to form a topcoat of desired thickness,
   heating to fuse or cure the coating powders,
wherein the same toughened epoxy resin is preferably used to form both the basecoat and the topcoat.

* * * * *